(12) United States Patent
Nakamura et al.

(10) Patent No.: US 11,656,410 B2
(45) Date of Patent: May 23, 2023

(54) OPTICAL FIBER FUSING AND CONNECTING MACHINE AND OPTICAL FIBER FUSING AND CONNECTING METHOD

(71) Applicant: SUMITOMO ELECTRIC OPTIFRONTIER CO., LTD., Yokohama (JP)

(72) Inventors: Shohei Nakamura, Yokohama (JP); Hiroshi Takayanagi, Yokohama (JP); Yuta Ryono, Yokohama (JP); Hideaki Yusa, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/430,177

(22) PCT Filed: Mar. 6, 2020

(86) PCT No.: PCT/JP2020/009854
§ 371 (c)(1),
(2) Date: Aug. 11, 2021

(87) PCT Pub. No.: WO2020/179927
PCT Pub. Date: Sep. 10, 2020

(65) Prior Publication Data
US 2022/0099895 A1    Mar. 31, 2022

(30) Foreign Application Priority Data
Mar. 7, 2019    (JP) .............................. JP2019-041400

(51) Int. Cl.
*G02B 6/255*    (2006.01)

(52) U.S. Cl.
CPC ......... *G02B 6/2553* (2013.01); *G02B 6/2555* (2013.01)

(58) Field of Classification Search
CPC .................................................. G02B 6/2553
See application file for complete search history.

(56) References Cited

U.S. PATENT DOCUMENTS

| 10,054,742 B2 * | 8/2018 | Sato ................... G02B 21/0016 |
| 2004/0047572 A1 | 3/2004 | Hattori |
| 2015/0378102 A1 | 12/2015 | Sugawara et al. |

FOREIGN PATENT DOCUMENTS

| JP | H08-021923 A | 1/1996 |
| JP | 2002-169050 A | 6/2002 |

(Continued)

*Primary Examiner* — Omar R Rojas
(74) *Attorney, Agent, or Firm* — Oliff PLC

(57) ABSTRACT

A fusion splicer includes an irradiation unit to irradiate an optical fiber with first wavelength light and second wavelength light; a light receiving unit; a processing unit to extract first feature data from first luminance information based on the first wavelength light and to extract second feature data from second luminance information based on the second wavelength light; a determination unit to determine whether the first feature data and the second feature data are within a predetermined range; and a drive unit to move one optical fiber on the basis of the luminance information from which the feature data is extracted so as to arrange the axes of the optical fibers in a predetermined positional relationship when the feature data is determined to be within the predetermined range. The processing unit extracts the second feature data when the first feature data is not within the predetermined range.

9 Claims, 8 Drawing Sheets

(56) References Cited

FOREIGN PATENT DOCUMENTS

JP  2010-261730 A  11/2010
KR  10-1181895 B1  9/2012

* cited by examiner

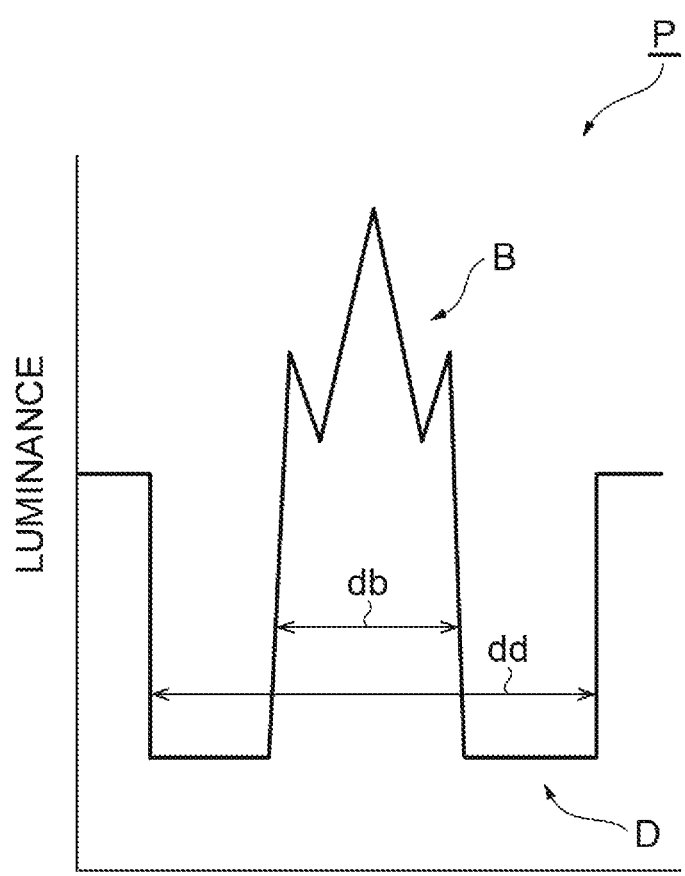

OPTICAL FIBER FUSING AND CONNECTING MACHINE AND OPTICAL FIBER FUSING AND CONNECTING METHOD

TECHNICAL FIELD

The present disclosure relates to a fusion splicer for optical fibers and a method for fusion-splicing optical fibers. The present application claims the benefit of the priority based on Japanese Patent Application No. 2019-041400, filed on Mar. 7, 2019, the entire contents disclosed in the application is incorporated herein by reference.

BACKGROUND ART

Patent Literatures 1 and 2 disclose fusion splicers for optical fibers. The fusion splicers determine types of optical fibers to be fusion-spliced, and fusion-splice them under suitable splicing conditions for the determined types of optical fibers.

CITATION LIST

Patent Literature

[Patent Literature 1] Japanese Unexamined Patent Publication No. JP 8(1996)-21923
[Patent Literature 2] Japanese Unexamined Patent Publication No. JP2002-169050
[Patent Literature 3] Japanese Unexamined Patent Publication No. JP2010-261730

SUMMARY OF INVENTION

One aspect of the present disclosure relates to a fusion splicer for fusion-splicing a pair of optical fibers to each other. The fusion splicer includes an irradiation unit, a light receiving unit, a processing unit, a determination unit, and a drive unit. The irradiation unit irradiates a side surface of at least one optical fiber of the pair of optical fibers with first wavelength light and second wavelength light. The light receiving unit receives the first wavelength light and the second wavelength light transmitted through the at least one optical fiber. The processing unit extracts first feature data of the at least one optical fiber from first luminance information based on the first wavelength light received by the light receiving unit, and extracts second feature data of the at least one optical fiber from second luminance information based on the second wavelength light received by the light receiving unit. The determination unit determines whether the first feature data and the second feature data extracted by the processing unit are within a predetermined range. When the first feature data or the second feature data is determined to be within the predetermined range, the drive unit moves at least one optical fiber of the pair of optical fibers on the basis of the first luminance information or the second luminance information from which the feature data within the predetermined range is extracted so as to arrange the axes of the pair of optical fibers in a predetermined positional relationship. In the fusion splicer, the processing unit extracts the first feature data when the determination unit determines that the first feature data is within the predetermined range, and extracts the second feature data when the determination unit determines that the first feature data is not within the predetermined range.

Another aspect of the present disclosure relates to a method for fusion-splicing a pair of optical fibers to each other by a fusion splicer including an irradiation unit to apply light at two different wavelengths, a light receiving unit to receive the light at two different wavelengths, and a control unit. The method for fusion-splicing the optical fibers includes, irradiating a side surface of at least one optical fiber of the pair of optical fibers with first wavelength light by the irradiation unit, receiving the first wavelength light transmitted through the at least one optical fiber by the light receiving unit, extracting first feature data of the at least one optical fiber by the control unit from first luminance information based on the first wavelength light received by the light receiving unit, determining by the control unit whether the first feature data is within a predetermined range, irradiating a side surface of the at least one optical fiber with second wavelength light by the irradiation unit, receiving the second wavelength light transmitted through the at least one optical fiber by the light receiving unit, extracting second feature data of the at least one optical fiber by the control unit from second luminance information of the at least one optical fiber based on the second wavelength light received by the light receiving unit when it is determined that the first feature data of the at least one optical fiber is not within the predetermined range, determining by the control unit whether the second feature data is within a predetermined range, moving at least one optical fiber of the pair of optical fibers on the basis of the first luminance information or the second luminance information from which the feature data determined to be within the predetermined range is extracted so as to arrange the axes of the pair of optical fibers in a predetermined positional relationship when the first feature data or the second feature data is determined to be within the predetermined range, and fusion-splicing the pair of optical fibers whose axes are arranged in a predetermined positional relationship.

BRIEF DESCRIPTION OF DRAWINGS

FIG. 2 is a diagram showing an example of a luminance profile obtained by the fusion splicer.

DESCRIPTION OF EMBODIMENTS

Figure 1:
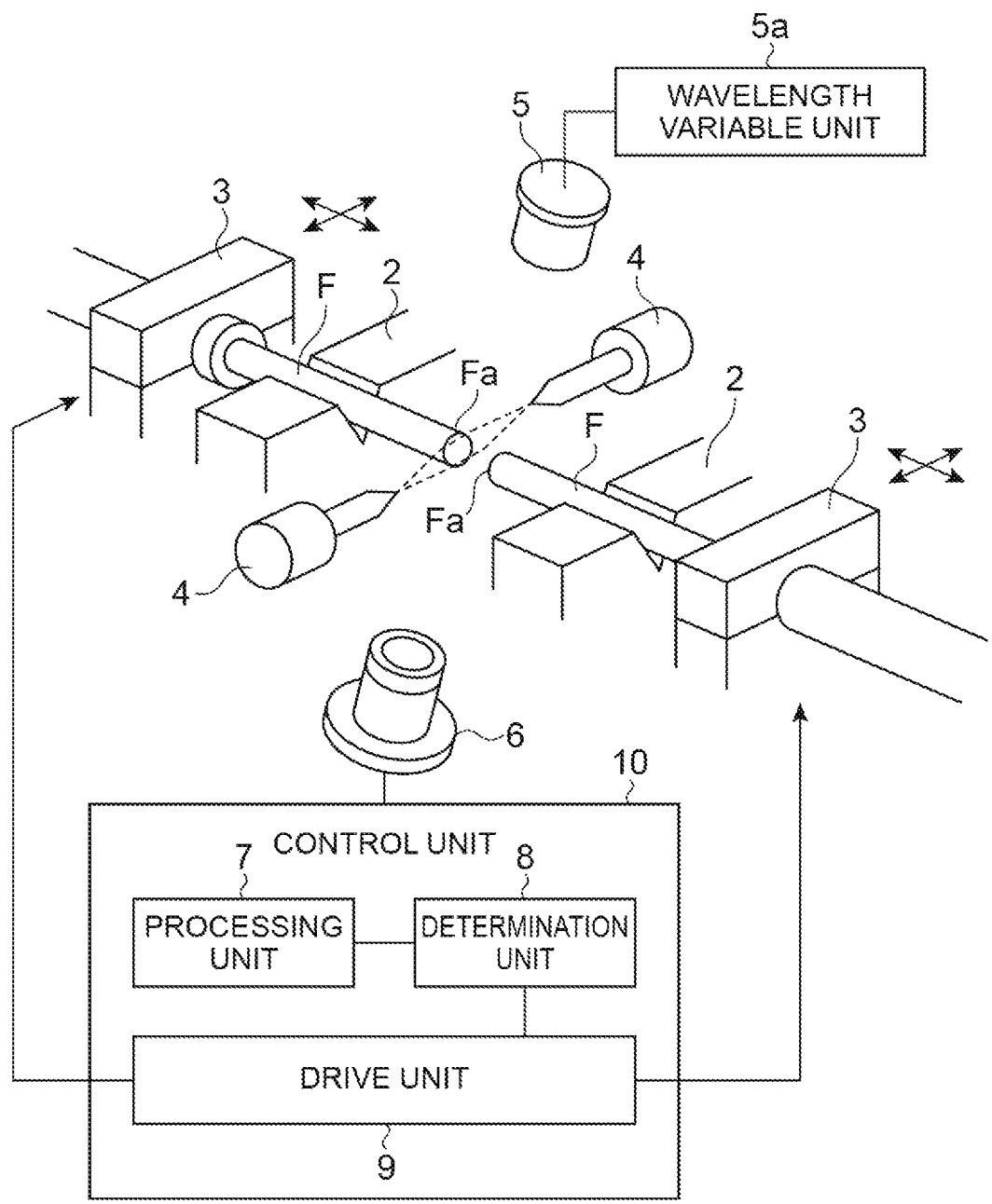
FIG. 1 is a diagram for explaining an outline of a fusion splicer according to an aspect of the present disclosure.

Problems to be Solved by the Present Disclosure

The fusion splicer described in Patent Literatures 1 and 2 irradiates a side surface of an optical fiber with light and acquires a luminance profile of the optical fiber from transmitted light thereof, and then detects a core portion of the optical fiber based on the luminance profile. When the fusion splicer acquires the luminance profile, the fusion splicer adjusts position of an imaging device that receives the transmitted light with a drive motor to adjust focal position of the transmitted light. However, adjustment of the focal position by the drive motor may take time, and it has been desired to detect the core portion of the optical fiber at high speed.

Advantageous Effects of the Present Disclosure

According to the present disclosure, it is possible to detect a core portion of an optical fiber at high speed.

Description of Embodiments of the Present Disclosure

Contents of embodiments of the present disclosure will be listed and described. A fusion splicer according to an embodiment of the present disclosure is a fusion splicer for fusion-splicing a pair of optical fibers to each other. The fusion splicer includes an irradiation unit, a light receiving unit, a processing unit, a determination unit, and a drive unit. The irradiation unit irradiates a side surface of at least one optical fiber of the pair of optical fibers with first wavelength light and second wavelength light. The light receiving unit receives the first wavelength light and the second wavelength light transmitted through the at least one optical fiber. The processing unit extracts first feature data of the at least one optical fiber from first luminance information based on the first wavelength light received by the light receiving unit, and extracts second feature data of the at least one optical fiber from second luminance information based on the second wavelength light received by the light receiving unit. The determination unit determines whether the first feature data and the second feature data extracted by the processing unit are within a predetermined range. When the first feature data or the second feature data is determined to be within the predetermined range, the drive unit moves at least one optical fiber of the pair of optical fibers on the basis of the first luminance information or the second luminance information from which the feature data within the predetermined range is extracted so as to arrange the axes of the pair of optical fibers in a predetermined positional relationship. In the fusion splicer, the processing unit extracts the first feature data when the determination unit determines that the first feature data is within the predetermined range, and extracts the second feature data when the determination unit determines that the first feature data is not within the predetermined range.

A conventional fusion splicer extracts feature data of an optical fiber to be spliced (e.g. a center position of an outer diameter of an optical fiber) by changing a lens position of a light receiving portion of the fusion splicer, and thereby determines whether its focal position is matched. In contrast, the fusion splicer according to the above-described embodiment is configured to be capable of irradiating at least one optical fiber of the pair of optical fibers to be spliced with the first wavelength light and the second wavelength light, and to be capable of receiving the first wavelength light and the second wavelength light. The fusion splicer is further configured to be capable of changing the focal position by changing wavelength of light applied to the optical fiber to be spliced, with using the difference in refractive indices depending on the wavelengths. As a result, the fusion splicer of the present embodiment can perform focus adjustment only by changing the wavelength of light to be irradiated or light to be received, and can detect the position of the optical fiber at high speed. Furthermore, since it is not necessary to use a high-precision drive motor for focus adjustment, the above-described embodiment can improve the long-term reliability of the fusion splicer, and simplify the imaging device or the like in the light receiving unit to reduce the cost. The fusion splicer may be a fusion splicer in which a motor for lens position adjustment and an adjustment mechanism based on the above-described wavelength change coexist as long as the speed of position detection of the optical fiber is not affected.

As one embodiment, the irradiation unit may irradiate a side surface of the pair of optical fibers with the first wavelength light and the second wavelength light. The light receiving unit may receive the first wavelength light and the second wavelength light transmitted through the pair of optical fibers. The processing unit may extract first feature data of the pair of optical fibers from first luminance information based on the first wavelength light received by the light receiving unit, and extract second feature data of the pair of optical fibers from second luminance information based on the second wavelength light received by the light receiving unit. The determination unit may determine whether the first feature data and the second feature data extracted by the processing unit for at least one optical fiber of the pair of optical fibers are within a predetermined range.

As one embodiment, the irradiation unit may be a light source configured to collectively apply light including the first wavelength light and the second wavelength light. According to this aspect, the configuration of the irradiation unit can be simplified. In this case, the light receiving unit may receive the first wavelength light and the second wavelength light separately. In addition, as an embodiment, the irradiation unit may include a first light source that applies the first wavelength light and a second light source that applies the second wavelength light, and can switch between the first light source and the second light source. According to this aspect, it is possible to reduce failures by simplifying each light source and improve long-term reliability.

As one embodiment, the first feature data and the second feature data each may include at least one of (a) a bright portion distance that is a distance of a bright portion that is a region in which the irradiation light transmitted through an optical fiber is projected onto an imaging element of the light receiving unit at a predetermined luminance or higher, (b) a dark portion edge distance that is a distance between edges of a dark portion that is a region in which the irradiation light transmitted through an optical fiber is projected onto an imaging element of the light receiving unit at a predetermined luminance or less or is not projected, (c) a ratio of the dark portion edge distance to the bright portion distance, and (d) feature data for determination obtained based on the bright portion distance, the dark portion edge distance, and the ratio. According to this aspect, it is possible to quickly perform the process of adjusting the focus of the light applied to the optical fiber.

As one embodiment, the second wavelength light may be light having a wavelength in a range of 560 nm or more and 600 nm or less, or in a range of 700 nm or more and 820 nm or less. According to the present inventors, it has been found that the luminance profile of the optical fiber is disturbed (see FIG. 4A) when the wavelength of the light applied to the optical fiber is low (less than 560 nm), and it is difficult to accurately extract the feature data (e.g. a bright portion distance) based on the luminance information of the optical fiber. For this reason, in order to extract feature data more accurately, it is preferable to use light having a wavelength of 560 nm or more (see FIGS. 4A and 4B). In addition, it is also known that there is a range (a wavelength of more than 600 nm and less than 700 nm) in which a change in feature data (e.g. a bright portion distance) based on luminance information of an optical fiber is small even when the wavelength is changed (see FIG. 5). Thus, by setting the wavelength of light with which the optical fiber is irradiated within the range of the above-described embodiment, it is possible to more reliably perform focus adjustment when observing the transmitted light of the optical fiber, and thus it is possible to further increase the speed of position detection of the optical fiber.

A fusion-splicing method according to another embodiment of the present disclosure is a method for fusion-splicing a pair of optical fibers to each other by a fusion splicer including an irradiation unit to apply light at two different wavelengths, a light receiving unit to receive the light at two different wavelengths, and a control unit. The method for fusion-splicing the optical fibers includes irradiating a side surface of at least one optical fiber of the pair of optical fibers with first wavelength light by the irradiation unit, receiving the first wavelength light transmitted through the at least one optical fiber by the light receiving unit, extracting first feature data of the at least one optical fiber by the control unit from first luminance information based on the first wavelength light received by the light receiving unit, determining by the control unit whether the first feature data is within a predetermined range, irradiating a side surface of the at least one optical fiber with second wavelength light by the irradiation unit, receiving the second wavelength light transmitted through the at least one optical fiber by the light receiving unit, extracting second feature data of the at least one optical fiber by the control unit from second luminance information of the at least one optical fiber based on the second wavelength light received by the light receiving unit when it is determined that the first feature data of the at least one optical fiber is not within the predetermined range, determining by the control unit whether the second feature data is within a predetermined range, moving at least one optical fiber of the pair of optical fibers on the basis of the first luminance information or the second luminance information from which the feature data determined to be within the predetermined range is extracted so as to arrange the axes of the pair of optical fibers in a predetermined positional relationship when the first feature data or the second feature data is determined to be within the predetermined range, and fusion-splicing the pair of optical fibers whose axes are arranged in a predetermined positional relationship. According to this method, similarly to the above-described fusion splicer, since the focus adjustment of the transmitted light of the optical fiber is performed by using the light of a plurality of wavelengths, the type of the optical fiber can be determined at high speed.

As one embodiment, the irradiating of the first wavelength light, the receiving of the first wavelength light, the extracting of the first feature data, the determining of the first feature data, the irradiating of the second wavelength light, the receiving of the second wavelength light, the extracting of the second feature data, and the determining of the second feature data, are performed for the pair of optical fibers in the above fusion-splicing method.

Details of Embodiments of the Present Disclosure

Specific examples of a fusion splicer and a fusion splicing method according to embodiments of the present disclosure will be described below with reference to the drawings. The present invention is not limited to these examples, but is defined by the scope of the claims, and is intended to include all modifications within the scope and meaning equivalent to the scope of the claims. In the following description, the same reference numerals are given to the same element in the description of the drawings, and redundant description is omitted.

A configuration of a fusion splicer according to the present embodiment will be described with reference to FIG. 1. FIG. 1 is a diagram for explaining an outline of a fusion splicer according to an aspect of the present disclosure. As shown in FIG. 1, a fusion splicer 1 is a fusion splicer for fusion-splicing a pair of optical fibers F to each other, and includes V-groove clamps 2, jacket clamps 3, a pair of discharge electrodes 4, an irradiation unit 5, a light receiving unit 6, a processing unit 7, a determination unit 8, and a drive unit 9. The processing unit 7, the determination unit 8, and the drive unit 9 constitute a control unit 10 that controls the fusion splicer 1.

The V-groove clamps 2 and the jacket clamps 3 are members for respectively supporting a pair of optical fibers F to be fusion-spliced. Each of the V-groove clamps 2 supports a portion of a bare fiber in which a jacket portion is removed from the optical fiber F to expose a glass portion. Each of the jacket clamps 3 holds a fiber portion of the optical fiber F with a fiber jacket. In the fusion splicer 1, distal ends Fa of the pair of optical fibers F are supported by the V-groove clamps 2 and the jacket clamps 3 so as to face each other, and are subjected to fusion splicing.

The pair of discharge electrodes 4 are disposed to face each other in a direction perpendicular to a direction in which the optical fibers extend, and are devices for fusion-splicing the distal ends Fa of the pair of optical fibers F by discharge. In the fusion splicer 1, after the axes of the pair of optical fibers F are aligned by the control unit 10 including the drive unit 9 described later, the distal ends Fa are fusion-spliced by the discharge electrode 4. The pair of optical fibers F are fusion-spliced under suitable fusion-splicing conditions for the types of the optical fibers F by controlling discharge current, discharge time, or the like of the discharge electrodes 4.

The irradiation unit 5 is a light irradiation device capable of irradiating side surfaces of the optical fibers F supported by the V-groove clamps 2 or the like with light at different wavelengths. For example, the irradiation unit 5 irradiates the optical fibers F with light having a first wavelength (first wavelength light) and light having a second wavelength (second wavelength light) that are different from each other. The irradiation unit 5 includes a wavelength variable unit 5a, and can change a wavelength of light to be irradiated each time according to an instruction from the control unit 10 or the like. The irradiation unit 5 may be a light source capable of collectively applying light including a plurality of different wavelengths (e.g. a so-called white light source). The irradiation unit 5 may include two or more types of single light sources having different wavelengths (e.g. lasers or LED light sources), and may be configured to switch between the single light sources to be irradiated according to an instruction from the control unit 10. The light having the first wavelength applied from the irradiation unit 5 is, for example, light having a wavelength in a range of 560 nm or more and 820 nm or less. The light having the second wavelength applied from the irradiation unit 5 is preferably light having a wavelength different from the first wavelength within a range of a wavelength of 560 nm or more and a wavelength of 600 nm or less or a range of a wavelength of 700 nm or more and a wavelength of 820 nm or less.

The light receiving unit 6 is a light receiving device capable of receiving light applied from the irradiation unit 5 and transmitted through the optical fiber F by an imaging element, and is configured to be capable of receiving any of light at different wavelengths applied from the irradiation unit 5. The light receiving unit 6 is configured to include an imaging device including the imaging element and a lens, and the transmitted light of the optical fiber F is imaged by the lens and is acquired by the imaging device or the like as a luminance profile (luminance information) of the optical fibers F. When the irradiation unit 5 is the light source capable of collectively irradiating light having a plurality of different wavelengths, the light receiving unit 6 may include a wavelength selective filter, and may receive light for each wavelength by this filter. The light receiving unit 6 outputs the acquired luminance profile to the processing unit 7. An example of the luminance profile P is shown in FIG. 2. In the luminance profile P, there is a region (bright portion B) having a relatively high luminance in which light is transmitted through the optical fiber and is condensed, at a central portion of the profile P, and dark portions D each having a low luminance (a small amount of transmitted light) are generated on both sides of this central portion. The light receiving unit 6 acquires a luminance profile having a slightly different shape for each wavelength of the received light.

The processing unit 7 extracts feature data of each optical fiber F from each luminance profile based on light having a predetermined wavelength received by the light receiving unit 6. That is, the processing unit 7 extracts feature data (first feature data, second feature data, or the like) of the optical fiber F for each luminance profile of light (transmitted light) having a different wavelength received by the light receiving unit 6. The term of "extract" includes not only simply extracting feature data from luminance profile data, but also creating new feature data by further processing the extracted feature data. Examples of the feature data include a bright portion distance (db), a dark portion edge distance (dd), and a ratio (rd=db/dd) of the bright portion distance (db) to the dark portion edge distance (dd). The bright portion distance (db), the dark portion edge distance (dd), and the ratio (rd=db/dd) of the bright portion distance (db) to the dark portion edge distance (dd) are data reflecting a core diameter, a cladding outer diameter, and a ratio of the core diameter to the cladding outer diameter, respectively, which are actual structures of the optical fiber. The core diameter, the cladding outer diameter, and the ratio of the core diameter to the cladding outer diameter can be converted from the bright portion distance (db), the dark portion edge distance (dd), and the ratio (rd) of the bright portion distance to the dark portion edge distance on the basis of a relationship obtained in advance and used as feature data for determination. The processing unit 7 passes the extracted feature data of the optical fiber (including the feature data for determination) to the determination unit 8. The bright portion distance (db), the dark potion edge distance (dd), and the ratio (rd=db/dd) of the bright portion distance (db) to the dark potion edge distance (dd) are not data in which the core diameter, the cladding outer diameter, and the like of the actual structure are precisely measured, but are date obtained in consideration of the arrangement, material, and structure of the optical system components used when observing optical fibers and the influence of the lens effect of the optical fibers to be observed. However, the bright portion distance (db), the dark potion edge distance (dd), and the ratio (rd=db/dd) of the bright portion distance (db) to the dark potion edge distance (dd) can be adequately converted by examining correspondence relationship between these data and the actual structural measurement results of the optical fibers in advance. These conversions may be performed by the processing unit 7 as necessary, and the converted feature data may be passed to the determination unit 8.

The determination unit 8 determines whether each feature data of the optical fibers F extracted by the processing unit 7 is within a predetermined range. In the determination unit 8, for example, when a ratio (R=rd/rdr) of between a ratio (rd) of an observed value of the core diameter to an observed value of the outer diameter of the cladding of the optical fiber and a ratio (rdr) obtained from a measured value of the core diameter and a measured value of the outer diameter of the cladding of the optical fiber, is set as the feature data, a range of 90% to 110% can be set as the predetermined range. This range serves as a guide for determining that the focal position in the reception of light transmitted through the optical fiber F is in an appropriate state, and can be obtained empirically. The predetermined range can be appropriately set to a different range depending on type(s) of the optical fiber or the like. Conversely, the ratio (db/dd) of the bright portion distance (db) to the dark portion edge interval (dd) at which the ratio (R) falls within the range of 90% to 110% may be obtained in advance, and these may be directly set as the predetermined range.

The determination unit 8 determines whether the acquired certain feature data of the optical fiber F is within the predetermined range.

When the feature data is within the predetermined range, the determination unit 8 detects the core portion of the optical fiber F using the luminance profile which is a source of the feature data, and instructs the drive unit 9 to perform the axis adjustment of the optical fiber F. On the other hand, when the determination unit 8 determines that the acquired certain feature data of the optical fiber F is not within the predetermined range, the determination unit 8 instructs the processing unit 7 to extract feature data of transmitted light having a wavelength different from the wavelength for the feature data used for the above determination. Thereafter, the determination unit 8 repeats this process until the acquired feature data of the optical fiber F falls within the predetermined range. When the characteristic data of the optical fiber F falls within the predetermined range, the determination unit 8 detects the position of the optical fiber F using the luminance profile that is the source of the characteristic data, and instructs the drive unit 9 to adjust the axis of the optical fiber F, as described above.

When the determination unit 8 determines that at least one feature data is within the predetermined range, the drive unit 9 detects the center position of the optical fiber based on an original luminance profile of the feature data, for example, the end position of the bright region or the end position of the dark region, and moves at least one optical fiber F by a predetermined drive mechanism to align the axes of the optical fibers. The drive unit 9 is a part that causes the drive mechanism to align the axes of the optical fibers F supported by the V-groove clamps 2 or the like based on the axis alignment instruction from the determination unit 8. More specifically, the drive unit 9 moves the V-groove clamps 2 or the jacket clamps 3 (or a base on which these are placed) which support the optical fibers F in the planar direction (X direction or Y direction) by a drive motor or the like that is the drive mechanism to align the axis.

Figure 6:
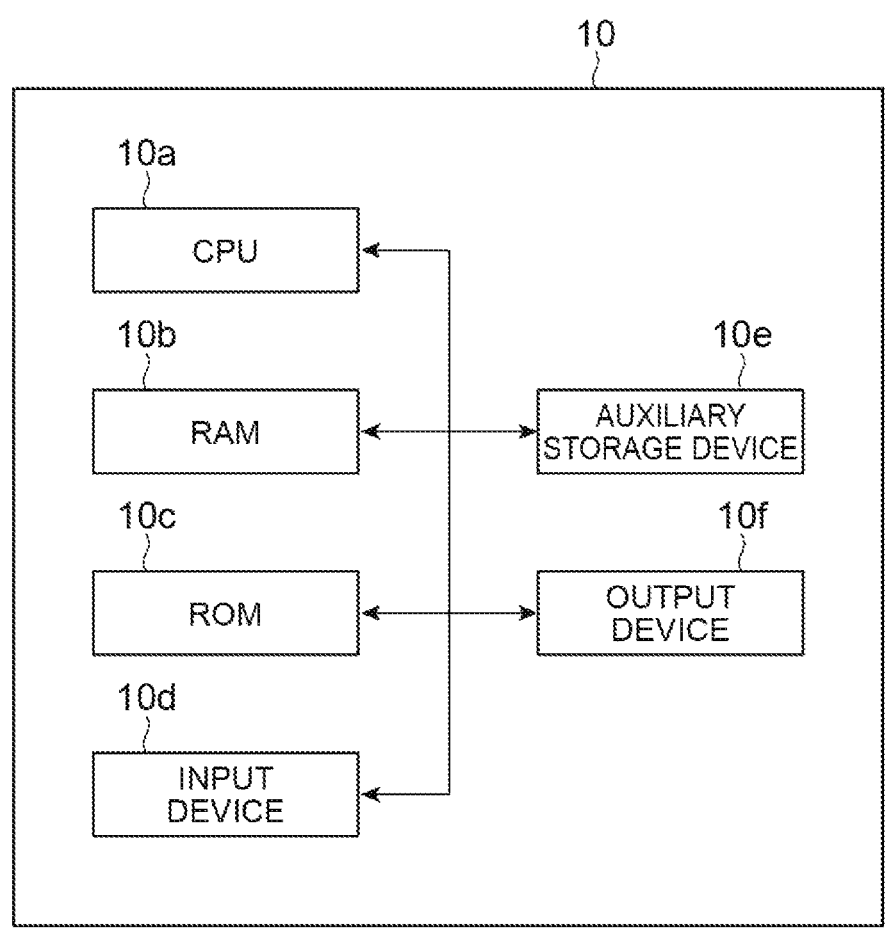
FIG. 6 is a block diagram showing a hardware configuration of a control unit of the fusion splicer shown in FIG. 1.

The fusion splicer 1 having such a configuration fusion-splices the distal ends Fa of the optical fibers F aligned at predetermined positions by the drive unit 9 by the discharge electrode 4. As shown in FIG. 6, the control unit 10 including the processing unit 7, the determination unit 8, and the drive unit 9 physically includes a computer including hardware such as a CPU10a, a RAM10b, a ROM10c, an input device 10d such as a keyboard, an auxiliary storage device 10e such as a semiconductor memory or a hard disk, and an output device 10f such as a display. The control unit 10 implements the above-described functions of the processing unit 7, the determination unit 8, and the drive unit 9 by operating the hardware under control of the CPU10a and reading and writing data from and to the RAM10b, the auxiliary storage device 10e, and the like by a program or the like loaded on the hardware such as the RAM10b.

Figure 3A:
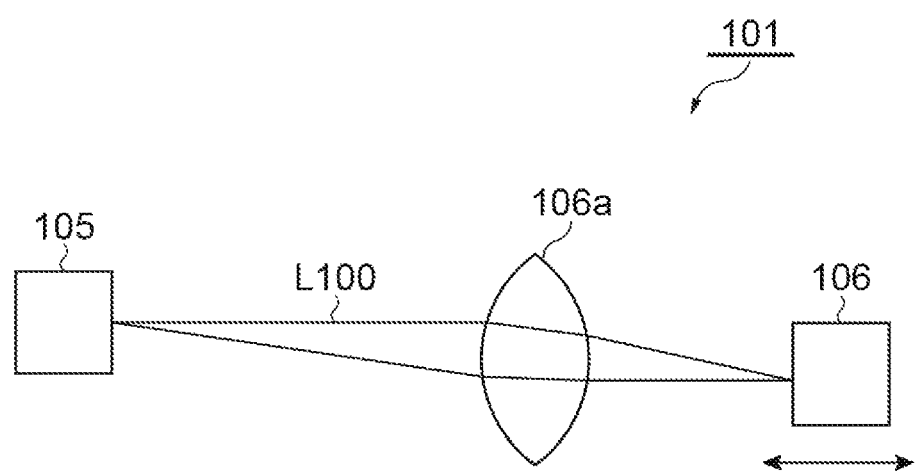
FIG. 3A is a diagram for explaining a focus adjustment process in a conventional fusion splicer.

Next, a difference in focus adjustment (also referred to as contrast adjustment) between the fusion splicer 1 according to the present embodiment and the conventional fusion splicer 101 will be described with reference to FIGS. 3A and 3B. First, focus adjustment in the conventional fusion splicer 101 will be described with reference to FIG. 3A. As shown in FIG. 3A, when light L100 from an irradiation unit 105 is incident on an imaging device of a light receiving unit 106 via the lens 106a in the fusion splicer 101, the light receiving unit 106 is moved close to or away from the lens 106a by a driving motor (not shown). Thereby, the focal point of the light L100 transmitted through the optical fiber F from the irradiation unit 105 is adjusted in the conventional fusion splicer 101.

Figure 3B:
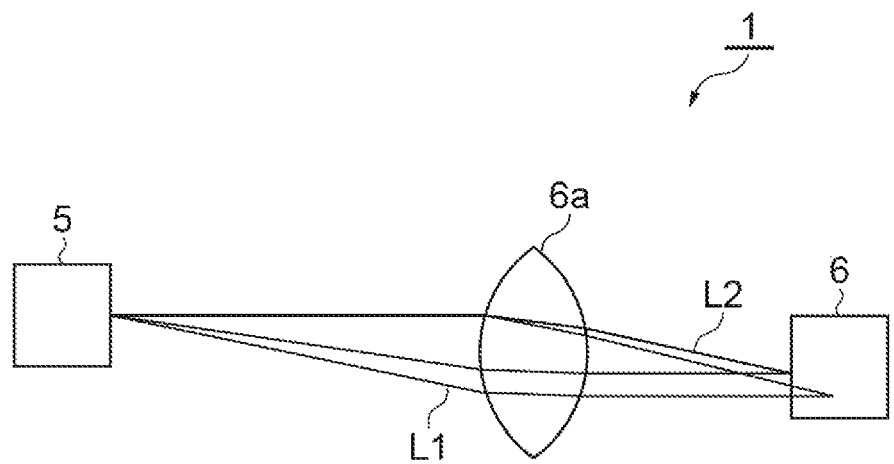
FIG. 3B is a diagram for explaining a focus adjustment process in the fusion splicer according to an aspect of the present disclosure.

On the other hand, as shown in FIG. 3B, when light L1 (first wavelength light) from the irradiation unit 5 enters the imaging device of the light receiving unit 6 via the lens 6a in the fusion splicer 1 according to the present embodiment, the processing unit 7 and the determination unit 8 extract feature data and determine whether the feature data is within the predetermined range. When the extracted feature date is not within the predetermined range, the determination unit 8 determines to be out of focus. In this case, the fusion splicer 1 enters light L2 (second wavelength light) having a wavelength different from that of the light L1 on the imaging device of the light receiving unit 6 via the lens 6a, and the processing unit 7 and the determination unit 8 extract feature data and determine whether the feature data is within the predetermined range. When it is determined that the feature data is within the predetermined range, it is determined that the focal point of the light L2 transmitted through the optical fiber F is located at the imaging device of the light receiving unit 6. When the feature data of the light L2 is not within the predetermined range, the fusion splicer 1 according to the present embodiment changes the wavelength of the light applied from the irradiation unit 5 to the side surface of the optical fiber F, and apply another light (third wavelength light). The fusion splicer 1 repeats the above-described extraction and determination processes until the feature data is within the predetermined range.

As described above, the focal position can be changed by changing the wavelength of the light to be irradiated based on the refractive index difference depending on the wavelength. This is because when light passing through the optical fiber F passes through the lens 6a and forms an image, the image forming position is shifted on the central axis due to the dispersion of the lens material. In the present embodiment, by utilizing this principle, the focal position of the light transmitted through the optical fiber F can be adjusted by changing the wavelength of the irradiation light without using a high-precision drive motor.

Here, a fusion-splicing method by the fusion splicer 1 based on such a principle will be described. In the fusion splicing process by the fusion splicer 1, first, the side surface of the optical fiber F is irradiated with the light of the first wavelength from the irradiation unit 5. The light of the first wavelength transmitted through the optical fiber F is received by the light receiving part 6. Subsequently, the first characteristic data of the optical fiber F is extracted by the processing unit 7 from the first luminance profile based on the light of the first wavelength received by the light receiving unit 6. As an example, first, a bright portion distance (db) and a dark portion edge distance (dd) are obtained, and the bright portion distance (db) and the dark portion edge distance (dd) are converted into a core diameter observation value and a fiber outer diameter observation value, and a ratio (rd) thereof is obtained. Next, the ratio (R1=rd/rdr) of the ratio (rd) of the bright portion distance (db) to the dark portion edge distance (dd), to the ratio (rdr) of the measured core diameter value to the measured fiber outer diameter value, which are separately measured, are calculated. The ratio R1 is defined as first feature data. The determination unit 8 determines whether the extracted first feature data (in this case, the ratio R1) is within the predetermined range. For example, as the predetermined range, the ratio R1 is set to 0.9 or more and 1.1 or less. When it is determined that the first feature data is within the predetermined range, that is, when $0.9 \leq R1 \leq 1.1$, the control unit 10 detects the center position of the optical fiber based on the first luminance information from which the first feature data is extracted, and thereby moves at least one of the optical fibers by the drive unit 9 to align the axes of the optical fibers.

On the other hand, when it is determined that the first feature data is not within the predetermined range, the control unit 10 irradiates the side surface of the optical fiber F with light having the second wavelength different from the first wavelength from the irradiation unit 5. The light of second wavelength transmitted through the optical fiber F is received by the light receiving part 6. Subsequently, the second characteristic data of the optical fiber F is extracted by the processing unit 7 from the second luminance profile based on the light of the second wavelength received by the light receiving unit 6. For example, the ratio R2 based on the light of the second wavelength is extracted in the same manner as the ratio R1 by performing the same processing as the case of extracting the first feature data based on the second luminance information, and is set as the second feature data. A determination part 8 determines whether the extracted second feature data is within the predetermined range. Here, as the predetermined range, the ratio R2 is set to 0.9 or more and 1.1 or less as described above. When it is determined that the extracted second feature data is within the predetermined range, that is, when $0.9 \leq R2 \leq 1.1$, the center position of the core or the center position of the outer diameter of the optical fiber is detected based on the second luminance information from which the second feature data is extracted, and thereby at least one of the optical fibers is moved by the drive unit 9 to align the axes of the optical fibers. If it is determined that the second feature data is not within the predetermined range, light having a different wavelength from the first wavelength and the second wavelength (the third wavelength light) is applied from the irradiation unit 5, and the above-described light reception, processing, and determination are repeated. The first feature data, the second feature data, the third feature data, the fourth feature data and the like may be based on the same feature (for example, all of them represent core diameters) or may be based on different features.

After the axes of the pair of optical fibers F coincide with each other, the optical fibers F are fusion-spliced by the discharge electrodes 4. Thus, the pair of optical fibers F are connected. In the case where the light applied from the irradiation unit 5 includes light of a plurality of wavelengths and the light of the composite wavelength is collectively applied, the light receiving unit 6 may receive light of each set wavelength by a wavelength selective filter or the like, temporarily store luminance profiles of other wavelengths in the storage unit, and use the luminance profiles in the above-described processing when necessary, for example, when focus adjustment cannot be performed by processing with the luminance profile of the first wavelength.

As described above, the fusion splicer 1 according to the present embodiment is configured to be capable of irradiating the optical fiber F to be spliced with light at different wavelengths and receiving the light, and is capable of changing the focal position by changing the wavelength of the light applied to the optical fibers F to be spliced by using the refractive index difference depending on the wavelength. In the related art, the focal point is adjusted by moving the lens position of the light receiving unit of the fusion splicer so that the feature data of the optical fiber to be connected falls within the predetermined range, whereas in the fusion splicer 1, the focal point can be adjusted only by changing the wavelength of the light to be irradiated or the light to be received, and the core portion of the optical fiber can be detected at high speed. Furthermore, according to the fusion splicer 1, since it is not necessary to use a high-precision drive motor for focus adjustment, it is possible to improve the long-term reliability of the fusion splicer 1 and to simplify the imaging device and the like in the light receiving unit 6 to reduce the cost.

In the fusion splicer 1, the irradiation unit 5 may be a light source capable of collectively applying light including a plurality of wavelengths. According to this aspect, the configuration of the irradiation unit 5 can be simplified. In this case, the light receiving unit 6 receives light having different wavelengths separated by a wavelength selective filter or the like.

In the fusion splicer 1, the irradiation unit 5 may include a plurality of single light sources each capable of applying light of different wavelengths, and may be capable of switching between the plurality of single light sources. According to this aspect, it is possible to reduce failures by simplifying each light source, and improve the long-term reliability of the fusion splicer 1.

Although the embodiments of the present disclosure have been described in detail, the present disclosure is not limited to the above-described embodiments and can be applied to various embodiments. For example, in the above-described embodiment, an example in which a high-precision drive motor for lens position adjustment is not used has been described, but a fusion splicer in which a motor for lens position adjustment and the above-described adjustment mechanism based on wavelength change coexist may be used as long as the speed of core portion detection of the optical fiber F is not affected. For example, a fusion splicer may be used in which a focus position is adjusted by a wavelength change after a lens position is roughly adjusted by a drive motor.

Figure 4A:
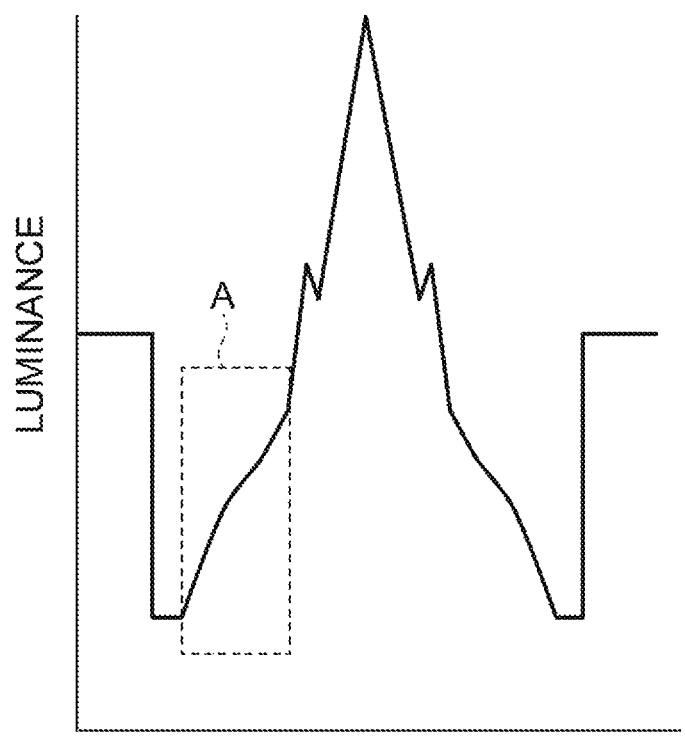
FIG. 4A is a diagram showing a luminance profile of an optical fiber when a wavelength of light to be irradiated is changed, and shows a luminance profile when the wavelength of light to be irradiated is less than 560 nm.
Figure 4B:
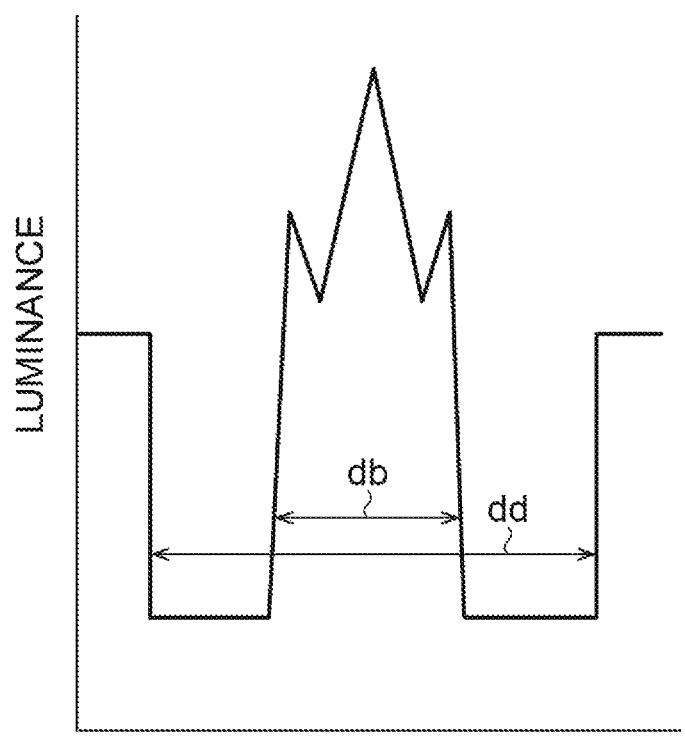
FIG. 4B is a diagram showing a luminance profile of an optical fiber when a wavelength of light to be irradiated is changed, and shows a luminance profile when the wavelength of light to be irradiated is 560 nm or more.

In the above-described embodiment, the light of different wavelengths applied from the irradiation unit 5 is not limited in more detail. When the feature data based on the luminance profile of the light transmitted through the optical fiber F is set to a value based on the ratio (rd) of the bright portion distance (bd) to the dark portion edge distance (dd), the second and subsequent irradiation light (second wavelength light) may be set to light within a range of 560 nm or more and 600 nm or less, or a range of 700 nm or more and 820 nm or less. This is because of the following reason. First, when a low-wavelength light source is used as a wavelength region in which the ratio (rd) of the bright portion distance (bd) to the dark portion edge distance (dd) can be observed, as shown in FIG. 4A, a part of an image profile (luminance value in a region A indicated by a dotted line in the figure), which is a luminance profile, is disturbed when light passes through the optical fiber F. Thus, the extraction, particularly, the extraction of the bright portion distance (bd)), is difficult or cannot be performed accurately in some cases. On the other hand, as shown in FIG. 4B, when the wavelength of light passing through the optical fiber F is in the range of 560 nm or more and 820 nm or less, the image profile (the luminance profile) is not disturbed and can be extracted.

Figure 5:
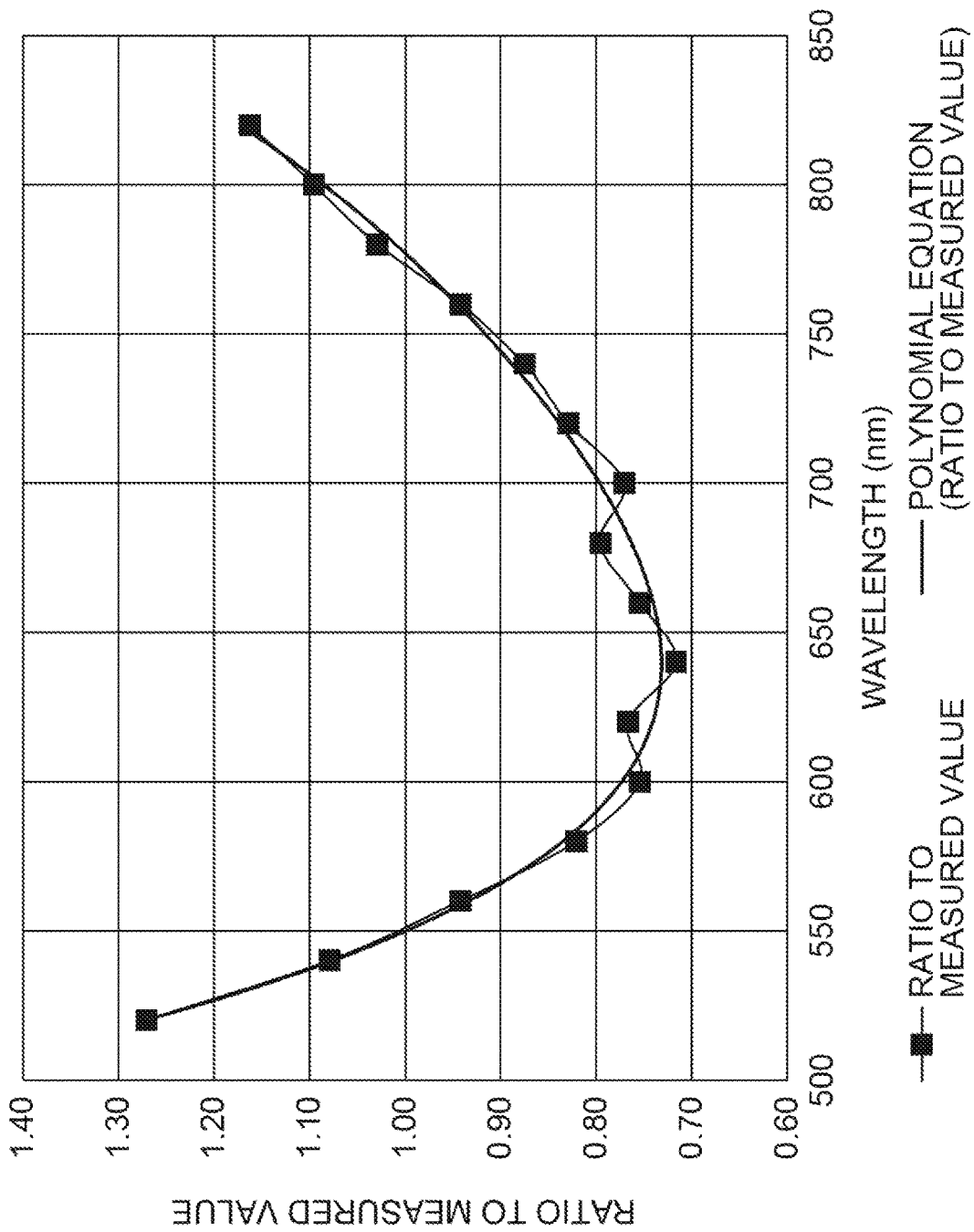
FIG. 5 is a graph showing a relationship between a wavelength of irradiation light in a focus adjustment method according to an aspect of the present disclosure and a ratio between feature data and a design value.

The reason for excluding light having a wavelength of more than 600 nm and less than 700 nm will be described with reference to FIG. 5. FIG. 5 shows the relationship of the ration (R=rd/rdr) of the ratio (rd) of the observed value of the core diameter to the observed value of the fiber outer diameter, to the ratio (rdr) of the measured value of the core diameter to the measured value of the fiber outer diameter when the wavelength is changed. The horizontal axis represents the wavelength of the irradiated light, and the vertical axis represents the ratio (R). In FIG. 5, both a graph showing the ratio R to the measured value including a plurality of plots indicated by squares and a graph based on an polynomial equation thereof are shown. Although the ratio (R) generally changes by changing the wavelength of the light to be irradiated, the value of the ratio (R) may draw a substantially U-shaped locus with respect to the wavelength as shown in FIG. 5, and even if the wavelength is changed, the ratio (R) does not change so much between the wavelength of more than 600 nm and less than 700 nm. Therefore, the use of the light in the wavelength range of more than 600 nm and less than 700 nm is excluded from the wavelengths of the second light and subsequent light in advance, thereby enabling faster processing.

Although the upper limit of the wavelength is not particularly limited, the upper limit of the wavelength of light to be irradiated is set to 820 nm in consideration of the capability as a generally usable light source. Accordingly, it is preferable that the wavelength of the second or subsequent light be within the above-described range.

In the above-described embodiment, the fusion splicer 1 detects the center positions of the pair of optical fibers F and moves at least one of the optical fibers F so that the axes of the pair of optical fibers F coincide with each other. The fusion splicer 1 may intentionally displace the axes of the pair of optical fibers F to each other and fusion the pair of optical fibers with its setting. That is, the fusion splicer 1 can place the pair of optical fibers F so that the central axes of the pair of optical fibers F have a predetermined positional relationship and splice the pair of optical fibers F to each other.

REFERENCE SIGNS LIST

1 Fusion splicer
2 V-groove clamp
3 Jacket clamp
4 Discharge electrode
5 Irradiation unit 6 Light receiving unit
6a Lens
7 Processing unit
8 Determination unit
9 Drive unit
10 Control unit
B Bright portion
D Dark portion
Db Bright portion distance
Dd Dark portion edge distance
F Optical fiber
L1 First wavelength light
L2 Second wavelength light
P Luminance profile

The invention claimed is:

1. A fusion splicer for fusion-splicing a pair of optical fibers to each other, comprising:
an irradiation unit configured to irradiate a side surface of at least one optical fiber of the pair of optical fibers with first wavelength light and second wavelength light;
a light receiving unit configured to receive the first wavelength light and the second wavelength light transmitted through the at least one optical fiber;
a processing unit configured to extract first feature data of the at least one optical fiber from first luminance information based on the first wavelength light received by the light receiving unit and to extract second feature data of the at least one optical fiber from second luminance information based on the second wavelength light received by the light receiving unit;
a determination unit configured to determine whether the first feature data and the second feature data extracted by the processing unit are within a predetermined range; and
a drive unit configured to move at least one optical fiber of the pair of optical fibers on the basis of the first luminance information or the second luminance information from which the first feature data or the second feature data within the predetermined range is extracted so as to arrange the axes of the pair of optical fibers in a predetermined positional relationship, when the first feature data or the second feature data is determined to be within the predetermined range,
wherein the processing unit extracts the first feature data when the determination unit determines that the first feature data is within the predetermined range, and the drive unit moves at least one optical fiber of the pair of optical fibers by using the first feature data so as to arrange the axes of the pair of optical fibers in a predetermined positional relationship, and
wherein the processing unit extracts the second feature data when the determination unit determines that the first feature data is not within the predetermined range, and the drive unit moves at least one optical fiber of the pair of optical fibers by using the second feature data so as to arrange the axes of the pair of optical fibers in a predetermined positional relationship.

2. The fusion splicer for optical fibers according to claim 1,
wherein the irradiation unit is configured to irradiate a side surface of the pair of optical fibers with the first wavelength light and the second wavelength light,
wherein the light receiving unit is configured to receive the first wavelength light and the second wavelength light transmitted through the pair of optical fibers,
wherein the processing unit is configured to extract first feature data of the pair of optical fibers from first luminance information based on the first wavelength light received by the light receiving unit, and to extract second feature data of the pair of optical fibers from second luminance information based on the second wavelength light received by the light receiving unit,
wherein the determination unit is configure to determine whether the first feature data and the second feature data extracted by the processing unit for at least one optical fiber of the pair of optical fibers are within a predetermined range.

3. The fusion splicer for optical fibers according to claim 1, wherein the irradiation unit is a light source configured to collectively apply light including the first wavelength light and the second wavelength light.

4. The fusion splicer for optical fibers according to claim 1, wherein the light receiving unit is configured to receive the first wavelength light and the second wavelength light separately.

5. The fusion splicer for optical fibers according to claim 1, wherein the irradiation unit includes a first light source configured to apply the first wavelength light and a second light source configured to apply the second wavelength light, and is configured to switch between the first light source and the second light source.

6. The fusion splicer for optical fibers according to claim 1,
wherein the first feature data and the second feature data each include at least one of
a bright portion distance that is a distance of a bright portion that is a region in which irradiation light transmitted through an optical fiber is projected onto an imaging element of the light receiving unit at a predetermined luminance or higher,
a dark portion edge distance that is a distance between edges of a dark portion that is a region in which the irradiation light transmitted through an optical fiber is projected onto an imaging element of the light receiving unit at a predetermined luminance or less or is not projected,
a ratio of the dark portion edge distance to the bright portion distance, and
feature data for determination obtained based on the bright portion distance, the dark portion edge distance, and the ratio.

7. The fusion splicer for optical fibers according to claim 1, wherein the second wavelength light is light having a wavelength in a range of 560 nm or more and 600 nm or less, or in a range of 700 nm or more and 820 nm or less.

8. A method for fusion-splicing a pair of optical fibers to each other by a fusion splicer comprising an irradiation unit configured to apply light at two different wavelengths, a light receiving unit configured to receive the light at two different wavelengths, and a control unit, the method comprising:
irradiating a side surface of at least one optical fiber of the pair of optical fibers with first wavelength light by the irradiation unit;
receiving the first wavelength light transmitted through the at least one optical fiber by the light receiving unit;
extracting first feature data of the at least one optical fiber by the control unit from first luminance information based on the first wavelength light received by the light receiving unit;
determining by the control unit whether the first feature data is within a predetermined range;
irradiating a side surface of the at least one optical fiber with second wavelength light by the irradiation unit;

receiving the second wavelength light transmitted through the at least one optical fiber by the light receiving unit;

extracting second feature data of the at least one optical fiber by the control unit from second luminance information of the at least one optical fiber based on the second wavelength light received by the light receiving unit when it is determined that the first feature data of the at least one optical fiber is not within the predetermined range; and determining by the control unit whether the second feature data is within a predetermined range;

moving at least one optical fiber of the pair of optical fibers by using the first feature data so as to arrange the axes of the pair of optical fibers in a predetermined positional relationship when the first feature data is determined to be within the predetermined range;

moving at least one optical fiber of the pair of optical fibers by using the second feature data so as to arrange the axes of the pair of optical fibers in a predetermined positional relationship when the second feature data is determined to be within the predetermined range; and fusion-splicing the pair of optical fibers whose axes are arranged in a predetermined positional relationship.

9. The method for fusion-splicing the pair of optical fibers to each other according to claim 8, wherein the irradiating of the first wavelength light, the receiving of the first wavelength light, the extracting of the first feature data, the determining of the first feature data, the irradiating of the second wavelength light, the receiving of the second wavelength light, the extracting of the second feature data, the determining of the second feature data, are performed for the pair of optical fibers.

* * * * *